United States Patent [19]
Johansson

[11] Patent Number: 4,853,959
[45] Date of Patent: Aug. 1, 1989

[54] METHOD AND APPARATUS FOR FEEDING POWER TO A TELEPHONE LINE SUCH THAT FOR RESTRICTED BATTERY VOLTAGE THERE IS ENABLED THE TRANSMISSION OF AN UNDISTORTED SPEECH SIGNAL

[75] Inventor: Hans V. Johansson, Bergshamra, Sweden

[73] Assignee: Telefonaktiebolaget L M Ericsson, Stockholm, Sweden

[21] Appl. No.: 158,271
[22] PCT Filed: May 26, 1987
[86] PCT No.: PCT/SE87/00262
  § 371 Date: Feb. 18, 1988
  § 102(e) Date: Feb. 18, 1988
[87] PCT Pub. No.: WO88/00420
  PCT Pub. Date: Jan. 14, 1988

[30] Foreign Application Priority Data

Jun. 27, 1986 [SE] Sweden ............................ 8602889

[51] Int. Cl.$^4$ ............................................ H04M 19/00
[52] U.S. Cl. .................................... 379/413; 379/399
[58] Field of Search ............... 379/413, 324, 395, 399, 379/345, 405

[56] References Cited

U.S. PATENT DOCUMENTS

| | | | |
|---|---|---|---|
| 4,431,874 | 2/1984 | Zobel et al. | 379/405 |
| 4,476,350 | 10/1984 | Aull et al. | 379/413 |
| 4,631,359 | 12/1986 | Johansson et al. | 379/413 |
| 4,727,574 | 2/1988 | Jakab | 379/413 |

OTHER PUBLICATIONS

Gray, Paul and Messerschmitt, David G., "Integrated Circuits for Telephony", Aug. 1980, pp. 1006–1007.
A Rydin et al., "Line Circuit Component SLIC for Axe 10", Ericsson Review, No. 4, 1983, pp. 192–200.

Primary Examiner—Stewart J. Levy
Assistant Examiner—Michele Simons
Attorney, Agent, or Firm—Burns, Doane, Swecker & Mathis

[57] ABSTRACT

A telephone set is fed with line current via a telephone line from final amplifiers. In order to transmit an undistorted speech signal at restricted battery voltage when the line is long, the final amplifiers are controlled in the following manner. A voltage sensing circuit senses a line voltage and controls first and second current-generating circuits which respectively send a first and a second current. A first difference-forming circuit generates a first difference current between a first reference current and the first current. A second difference-forming circuit generates a second difference current between the second current and a second reference current. When the second current is less than the second reference current the second difference current is diverted and assumes a zero value. A third difference current between the first and second difference current is amplified in an amplifier and controls the final amplifiers. When the line is long, and the line voltage exceeds a desired, fixed value, the second difference current exceeds its zero value and restricts the third difference current. The line current is thus restricted and voltage space for the speech signal is maintained.

2 Claims, 3 Drawing Sheets

4,853,959

METHOD AND APPARATUS FOR FEEDING POWER TO A TELEPHONE LINE SUCH THAT FOR RESTRICTED BATTERY VOLTAGE THERE IS ENABLED THE TRANSMISSION OF AN UNDISTORTED SPEECH SIGNAL

TECHNICAL FIELD

The invention comprises a method of feeding power to a telephone line such that for restricted battery voltage there is enabled the transmission of an undistorted speech signal, a line voltage between the connections of the telephone line being sensed, a first current corresponding to the line voltage generated, a first reference current generated and a first difference current generated, which answers to the difference between the first reference current and the first current, and an apparaus for carrying out the method.

BACKGROUND ART

In telephone networks with resistively powered telephone lines, the line current is determined by the pole voltage of a feed battery, the line resistance and the resistance of feed resistors through which the line is connected to the feed battery. The strength of the line current and also that of the transmitted speech signal will be lesser the longer the telephone line is. The telephone sets connected to the network sense the line current and amplify the speech signal so that the sound apprehended by the subscriber obtains the desired strength irrespective of the line length. In feeding power to telephone lines from electronic line circuits, the voltage characteristic of the resistively fed telephone network is imitated. An example of this kind of electronic line circuit is described in "Ericsson Review", No 4 1983, on pages 192-200, in the article "Line Circuit Component SLIC for AXE10", by A. Rydin and J. Sundvall. It is desirable that the power losses in the line circuits will be small, and low battery voltages are therefore used. The result of this is, however, that only short telephone lines can be powered as described in the reference. To avoid this problem, the electronic line circuit may be equipped with a means for restricting the line current so that a weakened speech signal can always be transmitted on a long telephone line. It is known here to allow this restriction to be dependent on the battery voltage, to enable transmission of a speech signal of full strength for as long lines as possible. This brings with it the disadvantage that a variation in battery voltage affects the power supply and constitutes an interference of the transmitted speech signal.

DISCLOSURE OF INVENTION

The aforementioned problems are solved in accordance with the invention by the restriction in the line current being introduced at a fixed point in the voltage characteristic of the telephone line independently of the battery voltage. The invention is characterised by the disclosures of the accompanying claims.

BRIEF DESCRIPTION OF DRAWINGS

An embodiment of the invention will be described in more detail with reference to a drawing, on which FIG. 1 schematically illustrates a known circuit for resistively powering a telephone line.

BEST MODE FOR CARRYING OUT THE INVENTION

Figure 1:
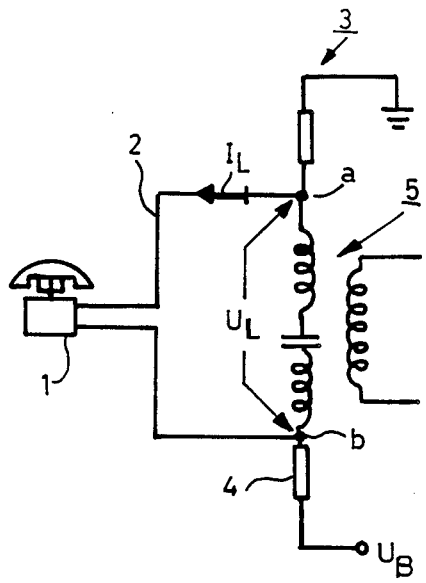
Figure 2:
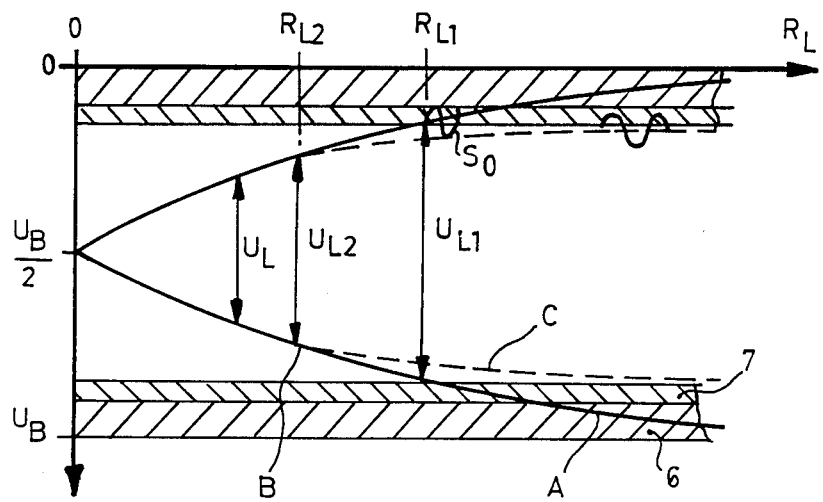
FIG. 2 is a diagram of a voltage characterisitic for this line.

A known apparatus for power supply in a telephone system, so called resistive power feed, is schematically illustrated in FIG. 1. A telephone set 1 is connected to a line circuit 3 via a line 2. The circuit has two feed resistors 4, connected to the two wires of the line 2 via respective points a and b. A battery voltage $U_B$ is connected across the resistors 4 and the connected line 2, and between the connection points a and b there are means 5 for transmitting a speech signal. The telephone set 1 and the line 2 have a total resistance, which is the line resistance $R_L$. The battery voltage $U_B$ is voltage-divided between the resistor 4 and the line resistance $R_L$ so that a line voltage $U_L$ occurs between the connection points a and b and the line is powered by a line current $I_L$. For an increased line length and accordingly increased line resistance $R_L$, the line voltage $U_L$ increases, as illustrated by the diagram of FIG. 2. The line characteristic or the response of the line voltage to the line resistance $R_L$ is shown by a graph A, drawn in full lines in the Fig. The potentials of the connection points a and b are here symmetrically distributed about half the battery voltage $\frac{1}{2} \times U_B$, which is called symmetric line feed.

The above described line characteristic of graph A can be accurately imitated with the aid of electronic circuits as described in the Ericsson Review reference. The length of the line that can be powered is restricted by the battery voltage $U_B$. A further restricting factor in electronic line circuits is that the transistors included in the circuits are partly non-linear. This results in that a part of the battery voltage $U_B$ remains unutilised, as is denoted by the hatched areas 6 in FIG. 2. Necessary signal space is reserved, as denoted by the hatched area 7, in order to transmit on the line a speech signal $S_O$ superposed on the line voltage $U_L$. In the illustrated example, the line voltage $U_L$ between the line connection points a and b may attain a highest value $U_{LI}$ for a line resistence of $R_{LI}$, if the line characteristic of graph A is maintained and an undistorted speech signal is to be transmitted. A great line length may be allowed if the battery voltage $U_B$ is increased. As mentioned, it is desired to avoid this to limit the power generation which would occur.

The foundation of the present invention lies in the concept of keeping a low battery voltage $U_B$ and maintaining the line characteristic up to a fixed point B on the graph A. The characteristic is altered and follows a graph C for large line resistances $R_L$, in the region after point B, so that signal space is also provided for long lines. With short lines that are in entire numerical majority the speech transmission will be unaffected. With the few long lines that there may be, an undistorted signal can always be transmitted. However, the line voltage $U_L$ of the graph C is lower than that of the graph A for the line resistance $R_L$. The line current $I_L$ sensed by the subscriber's telephone set 1 is also lower than what answers to this line resistance. The received signal will therefore be amplified to an insufficient degree in the telephone set 1, resulting in a low received sound level for the subscriber. The transmitted speech will be undistorted, however, and the speech signal is unaffected by variations in the battery voltage $U_B$, since the point B on the graph A is fixed independently of the battery voltage.

Figure 3:
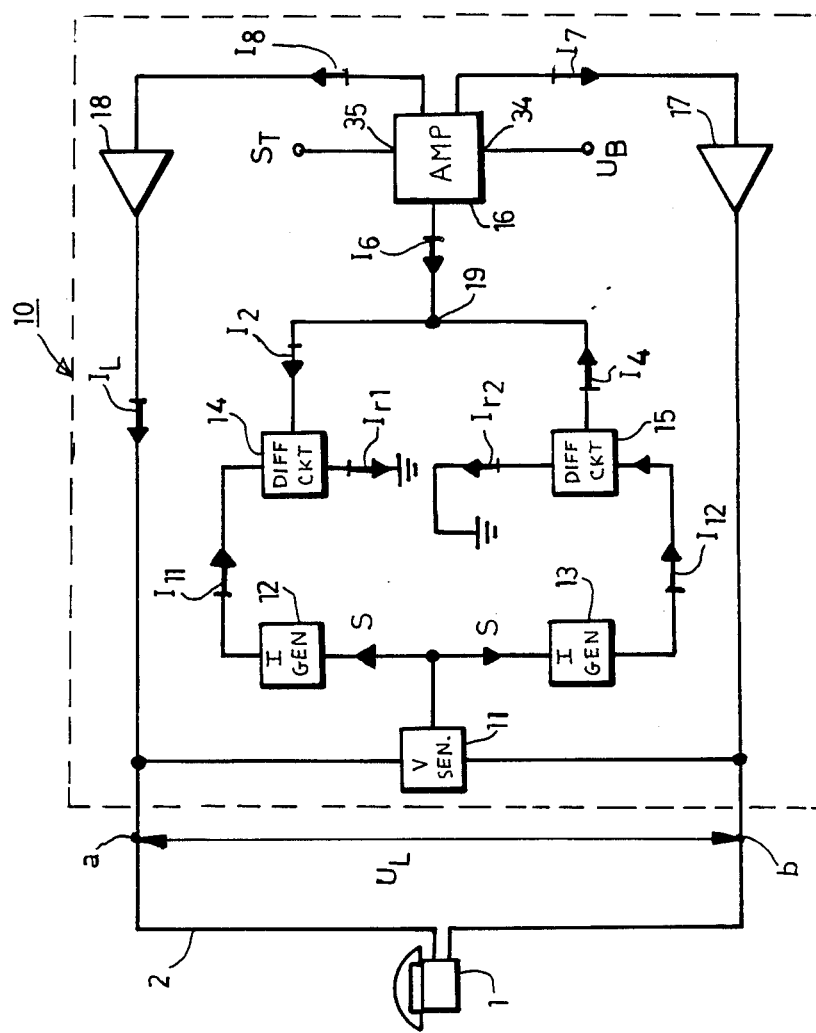
FIG. 3 is a block diagram of a line circuit in accordance with the invention and, FIG. 4 is a circuit diagram showing this line circuit in more detail.

A block diagram of a line circuit 10 in accordance with the invention is illustrated schematically in FIG. 3, this circuit being implemented such as to obtain the above described line characteristic according to the graphs A and C. This diagram will be described below and afterwards the blocks included in it will be described in more detail with reference to FIG. 4.

Via the line 2 the telephone set 1 is connected to the electronic line circuit 10 at the connection points a and b. The line circuit 10 is equipped with final amplifiers 17 and 18 with their outputs respectively connected to the points a and b. The amplifiers 17 and 18 feed current to the line 2 with line current $I_L$ so that the line voltage $U_L$ is maintained. The inventive line characteristic is obtained by the amplifiers 17 and 18 being controlled in the following way. The circuit 10 has a voltage sensing circuit 11 connected to the points a and b and which senses the line voltage $U_L$. The circuit 11 sends a signal S to a first current-generating circuit 12. This generates a first current $I_{11}$ proportional to the line voltage. The first current-generating circuit 12 is connnected to a first difference-forming circuit 14, which receives the first current $I_{11}$. The first difference-forming circuit 14 has means for generating a first reference current $I_{r1}$, and forms a first difference current $I_2 = I_{r1} - I_{11}$. The part of the apparatus in FIG. 3 so far described is substantially in agreement with the apparatus described in the Ericsson Review reference. If the first difference current $I_2$ is amplified in a suitable manner and fed out to the line 2, there is obtained a line characteristic according to graph A in FIG. 2. The inventive line circuit 10 has a second current-generating circuit 13 connected to the voltagesensing circuit 11 and receives from it the signal S. The second currentgenerating circuit 13 generates a second current $I_{12}$ proportional to the line voltage $U_L$. This circuit 13 is connected to a second difference forming circuit 15 and applies the second current $I_{12}$ to it. The second difference-forming circuit 15 has means for generating a second reference current $I_{r2}$ and forming a second difference current $I_4 = K \times (I_{12} - I_{r2})$ where K denotes a constant. For the second difference-forming circuit there is applicable the condition that as long as the value of the second current $I_{12}$ is less than that of the reference current $I_{r2}$ the difference current $I_4$ assumes a zero value. When the value of the second current $I_{12}$ is greater than that of the second reference current $I_{r2}$ the difference current $I_4$ assumes a positive value. The first 14 and second 15 difference-forming circuits have outputs which are connected to each other at a connection point 19. This point is also connected to an amplifier means 16. In this case a third difference current $I_6$ flows from the amplifier means 16 to the point 19. The current $I_6$ constitutes the difference between the first difference current $I_2$ and the second difference current $I_4$, $I_6 = I_2 - I_4$. The outputs of the amplifier means 16 are connected to inputs on the final amplifiers 17 and 18. These respectively receive currents $I_7$ and $I_8$ from the amplifier means 16, and the currents are proportional to the third difference current $I_6$, and feed the line 2 with the line current $I_L$.

The line characteristic of graph C from the point B, which was described in connection with FIG. 2 is obtained through the above-described arrangement in the following manner. The line voltage $U_L$ will exceed a value $U_{L2}$ for a line resistance $R_L$ which exceeds the line resistance $R_{L2}$ at point B according to FIG. 2. The second current $I_{12}$ will then exceed the second reference current $I_{r2}$ so that the second difference current $I_4$ gets a value greater than zero. The third difference current $I_6 = I_2 - I_4$ then decreases, and the line current $I_L$ from the final amplifiers 17 and 18 decreases in a corresponding degree. The line voltage $U_L$ then decreases and follows the graph C instead of graph A. The position of the point B is determined with the aid of the second reference current $I_{r2}$, and the contour of the graph C is affected by the magnitude of the above mentioned constant K.

Figure 4:
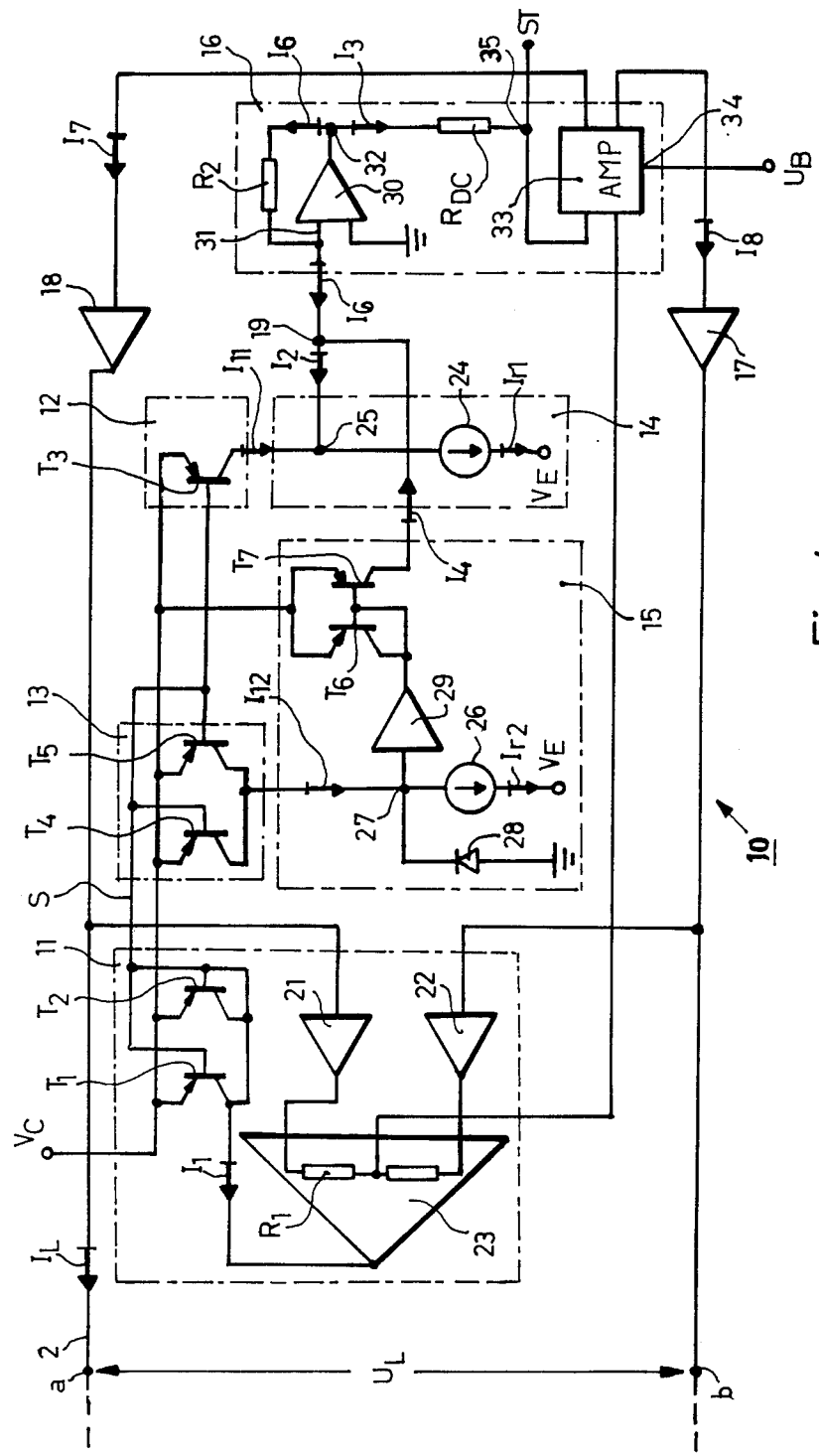

A diagram of the line circuit 10 is schematically illustrated in FIG. 4, where the blocks 11–16 of FIG. 3 are shown in more detail. The voltage sensing circuit 11 has two operational amplifiers 21 and 22, with their inputs respectively connected to the connection points a and b, the amplifiers sensing the line voltage $U_L$. The operational amplifiers are connected to a further amplifier 23, which has two resistors $R_1$. The output of the amplifier 23 is connected to the collectors on two transistors $T_1$ and $T_2$ with their emitters connected to an outside voltage source $V_C$. The transistors $T_1$ and $T_2$ send a direct current $I_1$ to the amplfier 23, whereat $I_1 = U_L/2R_1$. The common bases of the transistors are connected to their common collecors so that a base-emitter voltage in response to the current $I_1$ occurs, and this is the above-mentioned signal S. The first current-generating circuit is a transistor $T_3$, and is the same as either of the transistors $T_1$ and $T_2$. The transistor $T_3$ has its emitter connected to the voltage source $V_C$ and its base to the transistors $T_1$ and $T_2$. The transistor $T_3$ sends the current $I_{11}$, and since it is the same as either of the transistors $T_1$ and $T_2$ with its connections having the same potentials as theirs, the relationship $I_{11} = \frac{1}{2} \times I_1$ applies, i.e. so called reflecting in a current mirror. The collector of the transistor $T_3$ is connected to the first difference-forming circuit 14. The latter generates the first reference current $I_{r1}$ with the aid of a first reference current source 24 connected to a further voltage source $V_E = -5V$. The currents are subtracted at a connection point 25 between the reference current source 24 and the transistor $T_3$, so that the first difference current $I_2$ is generated.

The second current-generating circuit 13 has two transistors $T_4$ and $T_5$, which are the same as either of the transistors $T_1$ and $T_2$, so that by current mirror reflection the circuit 13 sends the second current $I_{12} = I_1$.

The second difference-forming circuit 15 has a second reference current source 26 which is connectd to the voltage source $V_E$ and generates the second reference current $I_{r2}$. The input of the source 26 is connected at a point 27 to one pole of a diode 28 and to the input of an amplifier 29. The other pole of the diode 28 is connected to ground potential, and the output of the amplifier 29 is connected to the collector of a transistor $T_6$, which has its base connected to its collector and its emitter to the voltage source $V_C$. The collector current of this transistor is current mirror reflected in a transistor $T_7$, which is identical to the transistor $T_6$. The second difference current $I_4$ is generated in the following manner. The current $I_{12}$ is divided at the connection point 27 so that the reference current $I_{r2}$ passes through the second reference current source 26, and the difference current $I_{12} - I_{r2}$ is sent to the amplifier 29. This is the case when $I_{12}$ is greater than $I_{r2}$, so that the diode 28 is back biased. If $I_{12}$ is less than $I_{r2}$ the diode 28 will be forward biased and a difference current $I_{r2} - I_{12}$ passes through it. No current is then fed to the amplifier 29. When $I_{12}$ is greater than $I_{r2}$, the difference current is sent to the amplifier 29 and is amplified by the factor K, which equals 3 in this embodiment. The amplified current, which is the second difference current $I_4$, is sent via the transistors $T_6$ and $T_7$ to the connection point 19.

The amplifier means 16 has an amplifier, between the input 31 and output 32 of which a resistor $R_2$ is connected, and which has its output 32 also connected to the input of an amplifier 33 via a ressitor $R_{DC}$. The input 31, which is connected to the point 19 is at ground potential. The difference between the first and second difference currents $I_2$ and $I_4$ is formed at the connection point 19, so that the third difference current $I_6$ is sent from the amplifier means 16 to the connection point 19. The third difference curent $I_6$ passes through the resistor $R_2$, so that the amplifier output 32 is given a potential $U = I_6 \times R_2$. This potential causes a current $I_3 = U/R_{DC}$ through the resistor $R_{DC}$. This is an external resistor, which may be readily changed to affect the line characteristic according to graph A. The current $I_3$ is amplified in the amplifier 33, which sends the currents $I_7$ and $I_8$ respectively to the final amplifiers 17 and 18. These amplifiers feed the subscriber line 2 with the line current $I_1$. The amplifier 33 has a terminal 34 for connection to the battery voltage $U_B$. The connection between the amplifier 33 and resistor $R_{DC}$ has a terminal 35 for an incoming speech signal $S_T$ from a subscriber calling the subscriber at the telephone set 1.

I claim:

1. A method of feeding power to a telephone line such that an undistorted speech signal may be transmitted thereon without encountering a limiting battery voltage, comprising the steps of:

sensing a line voltage between connections of the telephone line;

generating a first current proportional to said line voltage;

generating a first reference current and a first difference current, said first difference current being the difference between said first current and said first reference current;

generating a second current proportional to said line voltage;

generating a second reference current and a second difference current, said second difference current being proportional to the difference between said second current and said second reference current when said second current is greater than said second reference current and being substantially equal to zero when said second reference current is greater than said second current;

generating a third difference current proportional to the difference between the first difference current and the second difference current; and amplifying said third difference current to obtain a line current that is fed to the telephone line;

whereby, when the line has large resistance causing said line voltage to be similarly large, the line current is restricted by the second difference current, restricting in turn said line voltage, and leaving signal space between said line voltage and said battery voltage for said speech signal.

2. An apparatus connected to a telephone line for feeding power to the telephone line such that an undistorted speech signal may be transmitted thereon without encountering a limiting battery voltage, comprising:

a voltage-sensing circuit for sensing a line voltage between connections of the telephone line;

a first current-generating circuit, connected to said voltage-sensing circuit, for generating a first current proportional to said line voltage;

a first difference-forming circuit having a first reference current source, said first reference current source generating a first reference current and said first differenceforming circuit using said first reference current source to generate a first difference current, said first difference current being the difference between said first current and said first reference current;

a second current-generating circuit, connected to said voltage-sensing circuit, for generating a second current proportional to said line voltage;

a second difference-forming circuit, connected to said second current-generating circuit, having a second reference current source and a current diverting means, said second reference current source generating a second reference current and said second difference-forming circuit using said second reference current source to generate a second difference current, said second difference current being proportional to the difference between said second current and said second reference current when said second current is greater than said second reference current and being substantially equal to zero when said second reference current is greater than said second current, said current diverting means diverting said second difference current when the value of the second reference current is greater than that of the second current;

a third difference-forming circuit connected to said first and second difference-forming circuits for generating a third difference current proportional to the difference between the first difference current and the second difference current; and amplifier means connected to said third difference-forming circuit for amplifying said third difference current and for feeding the resulting line current to the telephone line.

* * * * *